United States Patent
Horvitz et al.

(10) Patent No.: US 9,305,263 B2
(45) Date of Patent: Apr. 5, 2016

(54) COMBINING HUMAN AND MACHINE INTELLIGENCE TO SOLVE TASKS WITH CROWD SOURCING

(75) Inventors: Eric Horvitz, Kirkland, WA (US); Paul B. Koch, Seattle, WA (US); Severin Hacker, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 923 days.

(21) Appl. No.: 12/827,307

(22) Filed: Jun. 30, 2010

(65) Prior Publication Data

US 2012/0005131 A1  Jan. 5, 2012

(51) Int. Cl.
| | | |
|---|---|---|
| G06F 17/00 | (2006.01) | |
| G06N 5/00 | (2006.01) | |
| G06N 5/04 | (2006.01) | |
| G06Q 10/06 | (2012.01) | |
| G06Q 10/10 | (2012.01) | |
| G06F 5/00 | (2006.01) | |

(52) U.S. Cl.
CPC ............... *G06N 5/043* (2013.01); *G06Q 10/06* (2013.01); *G06Q 10/101* (2013.01)

(58) Field of Classification Search
CPC ...... G06N 5/043; G06Q 10/06; G06Q 10/101
USPC .................................................... 706/11, 45
See application file for complete search history.

(56) References Cited

U.S. PATENT DOCUMENTS

| | | | |
|---|---|---|---|
| 5,402,117 A | 3/1995 | Zijderhand | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,104,712 A | 8/2000 | Robert et al. | |
| 6,125,388 A | 9/2000 | Reisman | |
| 6,236,933 B1 | 5/2001 | Lang | |
| 6,353,929 B1 | 3/2002 | Houston | |
| 6,466,232 B1 | 10/2002 | Newell et al. | |
| 6,513,046 B1 | 1/2003 | Abbott et al. | |

(Continued)

FOREIGN PATENT DOCUMENTS

| | | |
|---|---|---|
| WO | 9800787 | 1/1998 |
| WO | 0154044 | 7/2001 |

OTHER PUBLICATIONS

Quinn et al ("CrowdFlow: Integrating Machine Learning with Mechanical Turk for Speed-Cost-Quality Flexibility" May 2010).*

(Continued)

*Primary Examiner* — Lut Wong
(74) *Attorney, Agent, or Firm* — Alin Corie; Sandy Swain; Micky Minhas (57) ABSTRACT

Methods are described for ideally joining human and machine computing resources to solve tasks, based on the construction of predictive models from case libraries of data about the abilities of people and machines and their collaboration. Predictive models include methods for folding together human contributions, such as voting, with machine computation, such as automated visual analyses, as well as the routing of tasks to people based on prior performance and interests. An optimal distribution of tasks to selected participants of the plurality of participants is determined according to a model that considers the demonstrated competencies of people based on a value of information analysis that considers the value of human computation and the ideal people for providing a contribution.

20 Claims, 4 Drawing Sheets

(56) References Cited

U.S. PATENT DOCUMENTS

| | | | |
|---|---|---|---|
| 6,549,915 | B2 | 4/2003 | Abbott et al. |
| 6,587,600 | B1 | 7/2003 | Shipley |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,845,091 | B2 | 1/2005 | Ogier et al. |
| 6,957,393 | B2 | 10/2005 | Fano et al. |
| 7,013,149 | B2 | 3/2006 | Vetro et al. |
| 7,042,470 | B2 | 5/2006 | Rhoads et al. |
| 7,092,946 | B2 | 8/2006 | Bodnar |
| 7,343,222 | B2 | 3/2008 | Solomon |
| 7,395,126 | B2 | 7/2008 | Decker |
| 8,024,211 | B1 | 9/2011 | Cohen |
| 8,140,014 | B2 | 3/2012 | Liao |
| 8,204,776 | B2 | 6/2012 | Abhyanker |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott et al. |
| 2002/0044152 | A1 | 4/2002 | Abbott et al. |
| 2002/0052786 | A1 | 5/2002 | Kim et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0061261 | A1 | 3/2003 | Greene |
| 2003/0154476 | A1 | 8/2003 | Abbott et al. |
| 2004/0056103 | A1 | 3/2004 | Sepponen |
| 2004/0193696 | A1 | 9/2004 | Howard et al. |
| 2005/0004858 | A1 | 1/2005 | Foster et al. |
| 2005/0034078 | A1 | 2/2005 | Abbott et al. |
| 2005/0060198 | A1 | 3/2005 | Bayne |
| 2005/0061098 | A1 | 3/2005 | Huang |
| 2005/0234726 | A1 | 10/2005 | Torge et al. |
| 2006/0217843 | A1 | 9/2006 | Hara et al. |
| 2006/0265103 | A1 | 11/2006 | Orita |
| 2007/0016573 | A1 | 1/2007 | Nanavati et al. |
| 2007/0093940 | A1 | 4/2007 | Ng-Thow-Hing et al. |
| 2007/0294357 | A1 | 12/2007 | Antoine |
| 2008/0154796 | A1 | 6/2008 | Pallister et al. |
| 2008/0320087 | A1 | 12/2008 | Horvitz et al. |
| 2009/0088142 | A1 | 4/2009 | Baribault et al. |
| 2010/0159909 | A1 | 6/2010 | Stifelman |
| 2010/0248698 | A1 | 9/2010 | In et al. |
| 2010/0293026 | A1 | 11/2010 | Vojnovic et al. |
| 2010/0332281 | A1 | 12/2010 | Horvitz et al. |
| 2011/0098056 | A1 | 4/2011 | Rhoads et al. |
| 2011/0275388 | A1 | 11/2011 | Haney |
| 2011/0295722 | A1 | 12/2011 | Reisman |
| 2011/0313933 | A1 | 12/2011 | Dai et al. |
| 2012/0005131 | A1 | 1/2012 | Horvitz et al. |
| 2012/0029963 | A1 | 2/2012 | Olding et al. |
| 2012/0265573 | A1 | 10/2012 | Van Pelt et al. |
| 2012/0265574 | A1 | 10/2012 | Olding et al. |
| 2013/0046847 | A1 | 2/2013 | Zavesky et al. |
| 2014/0172767 | A1 | 6/2014 | Chen et al. |
| 2014/0278634 | A1 | 9/2014 | Horvitz et al. |
| 2014/0278657 | A1 | 9/2014 | Horvitz et al. |
| 2014/0279737 | A1 | 9/2014 | Horvitz et al. |

OTHER PUBLICATIONS

Welinder et al ("Online crowdsourcing: rating annotators and obtaining cost-effective labels" CVPR, Jun. 13-18, 2010).*

Dai et al (Decision-Theoretic Control of Crowd-SourcedWorkflows ICAPS May 12-16, 2010).*

Kapoor et al ("Complementary Computing for Visual Tasks: Meshing Computer Vision with Human Visual Processing" IEEE 2008).*

Dekel ("Vox Populi: Collecting High-Quality Labels from a Crowd" Jun. 18-21, 2009).*

E. Kamar, S. Hacker, E. Horvitz, "Combining Human and Machine Intelligence in Large-scale Crowdsourcing," AAMAS '12, Proceedings of the 11th International Conference on Autonomous Agents and Multiagent Systems—vol. 1, pp. 467-474.

Galaxy Zoo, 2007, Retrieved at <<http://zoo1.galaxyzoo.org/, 1 page.

Chickering, et al., "A Bayesian Approach to Learning Bayesian Networks with Local Structure", Retrieved at <<http://research.microsoft.com/en-us/um/people/heckerman/chm97uai.pdf>>, in UAI '97 Proceedings of the Thirteenth Conference on Uncertainty in Artificial Intelligence, 1997, 10 pages.

Dai, et al., "Artificial Intelligence for Artificial Artificial Intelligence", Retrieved at <<http://www.aaai.org/ocs/index.php/AAAI/AAAI11/paper/view/3775/4051>>, in AAAI Conference on Artificial Intelligence, 2011, 7 pages.

Dai, et al., "Decision-Theoretic Control of Crowd-Sourced Workflows", Retrieved at <<http://www.aaai.org/ocs/index.php/AAAI/AAAI10/paper/view/1873/2170>>, in AAAI Conference on Artificial Intelligence, 2010, 7 pages.

Heckerman, et al., "Toward Normative Expert Systems: The Pathfinder Project", Stanford University, Knowledge Systems Laboratory, Medical Computer Science, 1991.

Ipeirotis, Panagiotis, "Analyzing the Amazon Mechanical Turk Marketplace", Retrieved at <<http://www.ipeirotis.com/wp-content/uploads/2012/01/xrds2011.pdf>>, in XRDS: Crossroads, The ACM Magazine for Students, 17(2): 16-21, 2010.

Kocsis, et al., "Bandit based monte-carlo planning", Retrieved at <<http://citeseerx.ist.psu.edu/viewdoc/download?doi=10.1.1.102.1296&rep=rep1&type=pdf>>, in ECML '06 Proceedings of the 17th European Conference on Machine Learning, 2006, pp. 282-293.

Krause, et al., "Toward Community Sensing", Retrieved at <<http://www.msr-waypoint.net/en-us/um/people/horvitz/community_sensing.pdf>>, in International Conference on Information Processing in Sensor Networks (IPSN), IEEE, 2008, 12 pages.

Lintott, et al., "Galaxy Zoo: morphologies derived from visual inspection of galaxies from the Sloan Digital Sky Survey", Retrieved at <<http://mnras.oxfordjournals.org/content/389/3/1179.full.pdf+html>>, in Monthly Notices of the Royal Astronomical Society, 389(3), 2008, pp. 1179-1189.

Shahaf, et al., "Generalized Task Markets for Human and Machine Computation", Retrieved at <<http://citeseerx.ist.psu.edu/viewdoc/download?doi=10.1.1.186.7034&rep=rep1&type=pdf>>, in AAAI Conference on Artificial Intelligence, 2010, 8 pages.

Sheng, et al., "Get Another Label? Improving Data Quality and Data Mining Using Multiple, Noisy Labelers", Retrieved at <<http://http://www.ipeirotis.com/wp-content/uploads/2012/01/kdd2008.pdf>>, KDD '08, Aug. 24-27, 2008, Las Vegas, Nevada, USA, pp. 614-622.

Snow, et al., "Cheap and Fast—But is it Good? Evaluating Non-Expert Annotations for Natural Language Tasks", Retrieved at <<http://citeseerx.ist.psu.edu/viewdoc/download?doi=10.1.1.142.8286&rep=rep1&type=pdf>>, in EMNLP '08, Proceedings of the 2008 Conference on Empirical Methods in Natural Language Processing, 2008, pp. 254-263.

Von Ahn, et al., "Designing Games With a Purpose", Retrieved at <<https://www.cs.cmu.edu/~biglou/GWAP_CACM.pdf>>, Communications of the ACM, vol. 51, No. 8, Aug. 2008, 10 pages.

Whitehill, et al., "Whose Vote Should Count More: Optimal Integration of Labels from Labelers of Unknown Expertise", Retrieved at <<http://citeseerx.ist.psu.edu/viewdoc/download?doi=10.1.1.184.9401&rep=rep1&type=pdf>>, in Advances in Neural Information Processing Systems (NISP), 2009, 9 pages.

"Amazonmechanical Turk, Artificial Artificial Intelligence," [Online at <<https://www.mturk.com/mturk/welcome>>], 2005 Release, 1 page.

(56) References Cited

OTHER PUBLICATIONS

International Search Report and Written Opinion, dated Oct. 21, 2008 for PCT Application Serial No. PCT/US2008/066302, 10 Pages.
Chang et al., "Developing Collaborative Applications with Mobile Cloud—A Case Study of Speech Recognition," In Journal of Internet Services and Information Security, vol. 1, Issue 1, May, 2011, pp. 18-36.
Chetan et al., "Cloud Computing for Mobile World," Retrieved on Sep. 22, 2011, at <<http://chetan.ueuo.com/projects/CCMW.pdf>>, 7 pages.
Finley, "The 8 Most Important Types of Collaboration Apps for Smart Phones," Retrieved on Sep. 22, 2011 at http://www.readwriteweb.com/enterprise/2011/07/post-4.php, 2 pages.
Andy Harter, et al., A Distributed Location System for the Active Office, IEEE Network, Jan.-Feb. 1994, pp. 62-70.
Guanling Chen, et al., A Survey of Context-Aware Mobile Computing Research, Dartmouth Computer Science Technical Report, Nov. 2000, 16 pages.
William Noah Schilt, A System Architecture for Context-Aware Mobile Computing, Columbia University, May 1995, 153 pages.
Mike Spreitzer, et al., Providing Location Information in a Ubiquitous Computing Environment, SIGOPS '93, vol. 27 Issue 5, Dec. 1993, pp. 270-283.
Marvin Theimer, et al., Operating System Issues for PDAs, In Fourth Workshop on Workstation Operating Systems, Oct. 14-15, 1993, 7 pages.
Roy Want, Active Badges and Personal Interactive Computing Objects, IEEE Transactions on Consumer Electronics, vol. 38, No. 1, Feb. 1992, 11 pages.
Bill N. Schilit, et al., The ParcTab Mobile Computing System, IEEE WWOS-IV, Oct. 1993, 4 pages.
Bill Schilit, et al., Context-Aware Computing Applications, In Proceedings of the Workshop on Mobile Computing Systems and Applications, Dec. 1994, pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, vol. 36, No. 7, 1 page.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, Mar. 14-18, 1998, 8 pages.
Bradley J. Rhodes, Remembrance Agent: A continuously running automated information retrieval system, The Proceedings of The First International Conference on The Practical Application of Intelligent Agents and Multi Agent Technology, Apr. 1996, 4 pages.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, 6 pages.
Eric Horvitz, et al., Attention-Sensitive Alerting in Computing Systems, Microsoft Research, Aug. 1999.
Bill N. Schilit, et al., Disseminating Active Map Information to Mobile Hosts, IEEE Network, Sep.-Oct. 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, Oct. 13-14, 1997, 10 pages.
Workshop on Wearable Computing Systems, Aug. 19-21, 1996.
Mark Billinghurst, Research Directions in Wearable Computing, University of Washington, May, 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
Robert M. Losee, Jr, Minimizing information overload: the ranking of electronic messages, Journal of Information Science 15, Elsevier Science Publishers BV, Jun. 28, 1998, 17 pages.
Leonard Low. Connections: Social and mobile tools for enhancing learning, The Knowledge Tree—an e-Journal of Learning Innovation_http://kt.flexib lelearning_net.au/edition-12-editorial-2/connectio ns-social-and-mobile-tools-for-enhancing-learning-by-leonard-low/_Last accessed Dec. 19, 2006.
Chung-Hsien Kuo, et al. Design and Implementation of Internet-Based In-House Healthcare and Home Automation Systems, http://ieeexplore.ieee.org/iel5/8811/27877/01244339_pdf?isNumber= Last accessed Dec. 19, 2006.
T.C. Liu, et al. Wireless and mobile technologies to enhance teaching and learning_Journal of computer Assisted Learning, 2003. vol. 19, pp. 371-382. http://www.aclass.com.tw/ReTech/download/Wirel ess%20and% 20mobile%2otechnologies%2oto%20enhance%2o teaching%20and%20learning.pdf, Last accessed Dec. 19, 2006.
Santana et al., UPNP Service Discovery for Heterogeneous Networks, Jun. 2006.
Miluzzo, et al., "Darwin Phones: The Evolution of Sensing and Inference on Mobile Phones", In Proceedings of the 8th International Conference of Mobile Systems, Applications, and Services, Jun. 15-18, 2010, 16 pages.
PCT/US00/20685, International Search Report, Sep. 29, 2003, 3 pages.
U.S. Appl. No. 11/767,140, Non Final Office Action Mailed Jun. 1, 2009, 13 pages.
U.S. Appl. No. 11/767,140, Response to Non Final Office Action Mailed Jun. 1, 2009, filed Sep. 1, 2009, 19 pages.
U.S. Appl. No. 11/767,140, Final Office Action Mailed Jan. 25, 2010, 20 pages.
U.S. Appl. No. 11/767,140, RCE/Response to Final Office Action Mailed Jan. 25, 2010, filed Apr. 7, 2010, 32 pages.
U.S. Appl. No. 11/767,140, Non Final Office Action Mailed Nov. 28, 2011, 37 pages.
U.S. Appl. No. 11/767,140, Response to Non Final Office Action Mailed Nov. 28, 2011 filed Feb. 13, 2012, 25 pages.
U.S. Appl. No. 11/767,140, Non Final Office Action Mailed Jul. 31, 2012, 32 pages.
U.S. Appl. No. 11/767,140, Response to Non Final Office Action Mailed Jul. 31, 2012, filed Nov. 29, 2011, 30 pages.
U.S. Appl. No. 11/767,140, Final Office Action Mailed Mar. 22, 2013, 35 pages.
Khazankin, et al., "QoS-based Task Scheduling in Crowdsourcing Environments", In Ninth International Conference on Service Oriented Computing, Dec. 5, 2011, pp. 15.
Fried, Daniel, "Crowdsourced Applications of Human Computation", Retrieved on: Oct. 8, 2012, Available at: https://next.eller.arizona.edu/courses/24hourKnowledgefactory/Spring2011/student_papers/finaldanielfried.pdf.
Viappiani, et al., "A Bayesian Concept Learning Approach to Crowdsourcing", In Workshops at the Twenty-Fifth Conference on Artificial Intelligence, Aug. 7, 2011, pp. 8.
Mausam, et al., "Artificial Intelligence for Artificial Artificial Intelligence" In Proceedings of the Twenty-Fifth Conference on Artificial Intelligence, Aug. 2011, pp. 7.

(56) References Cited

OTHER PUBLICATIONS

Kearns, et al., "A Sparse Sampling Algorithm for Near-Optimal Planning in Large Markov Decision Processes" In Proceedings of the 16th International Joint Conference on Artificial Intelligence, vol. 2, Jul. 31, 1999, pp. 6.

Silver, et al., "Monte-Carlo Planning in Large POMDPs", In Advances in Neural Information Processing Systems, Dec. 6, 2010, pp. 9.

Little et al., "MSG Instant Messenger: Social Presence and Location for the Ad Hoc Learning Experience", In Proceedings of JIME Special Issue: Researching Open Content in Education, Dec. 29, 2010, 11 pages.

Nardi et al., "Integrating Communication and Information through ContactMap", In Proceedings of Communications of the ACM, Apr. 2002, 7 pages.

Vogiazou et al., "From Buddyspace to CitiTag: Large-Scale Symbolic Prescence for Community Building and Spontaneous Play", In Proceedings of the ACM Symposium on Applied Computing, Mar. 13, 2005, 8 pages.

Response filed Sep. 9, 2015 to Non-Final Office Action dated Jun. 9, 2015 from U.S. Appl. No. 13/843,293, 36 pages.

Non-Final Office Action mailed Jun. 9, 2015 from U.S. Appl. No. 13/843,293, 25 pages.

Preliminary Amendment filed Apr. 20, 2015 from U.S. Appl. No. 13/843,293, 8 pages.

Final Office Action mailed Sep. 18, 2015 from U.S. Appl. No. 13/831,652, 36 pages.

Response filed Jul. 6, 2015 to Non-Final Office Action mailed Apr. 3, 2015 from U.S. Appl. No. 13/831,652, 14 pages.

Non-Final Office Action mailed Apr. 3, 2015 from U.S. Appl. No. 13/831,652, 25 pages.

Final Office Action mailed Dec. 16, 2015 from U.S. Appl. No. 13/843,293, 31 pages.

* cited by examiner

COMBINING HUMAN AND MACHINE INTELLIGENCE TO SOLVE TASKS WITH CROWD SOURCING

BACKGROUND

Crowd sourcing generally refers to methods for soliciting solutions to tasks via open calls to a large scale community. Crowd sourcing tasks are commonly broadcasted through a central website. The website may describe a task, offer a reward for completion of the task, and set a time limit in which to complete the task. A reward can be provided for merely participating in the task. The reward can also be provided as a prize for submitting the best solution or one of the best solutions. Thus, the reward can provide an incentive for members of the community to complete the task as well as to ensure the quality of the submissions.

A crowd sourcing community generally includes a network of members. For a given task, the number of members who are available, capable, and willing to participate in the task is finite. Further, only a subset of those members may provide the best solutions. As the number of crowd sourcing tasks increases, the number of desirable members who can complete the tasks may diminish. As a result, the ability to efficiently utilize the crowd sourcing community can be crucial with the increasing application of crowd sourcing as a means for completing tasks.

It is with respect to these and other considerations that the disclosure made herein is presented.

SUMMARY

Technologies are described herein for combining human and machine intelligence to route and solve tasks with crowd sourcing. Through the utilization of the technologies and concepts presented herein, computer-based resources can provide computer-based guidance about a particular task. Technologies are provided that can combine the computer-based guidance with observations regarding the experience and expertise of human resources in order to determine an optimal distribution of the task to the human resources. In particular, the optimal distribution may identify where human effort is best suited to solve the task. The technologies may employ probabilistic and decision-theoretic methods to determine the optimal distribution.

According to some embodiments, technologies are provided for combining human and machine intelligence to route and solve tasks with crowd sourcing. The technologies receive computer-based guidance for solving a task from a computer-based resource. The technologies receive human-based contributions for solving the task. The technologies generate a model for combining the computer-based guidance and the human-based contributions. The technologies generate a global solution to the task by combining the computer-based guidance and the human-based contributions according to the model.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for combining human and machine intelligence to route and solve tasks with crowd sourcing, in accordance with some embodiments. Some embodiments may utilize a first machine-based model to combine human votes along with predictive output of a machined-based probabilistic model to assign a probability that an item is in a particular class of item, or more generally, to refine a probability distribution over classes of the item. The first machine-based model and the machine-based probabilistic model may be generated and trained according to suitable machine learning methods.

Some further embodiments may utilize a second machine-based model (also referred to herein as a model of expertise) to effectively route a task (e.g., voting on the item) to human resources better suited to completing the task. The model of expertise may utilize the predictive output of the machine-based probabilistic model in order to guide the tasks to the appropriate human resources. The model of expertise may be trained based on training data about the human resources via suitable machine learning methods. For example, the training data may include information about each individual, such as the individual's background, in the human resources. The model of expertise can be utilized to compute an "expected value of information" for each individual (e.g., the expected value of the individual's vote) in the human resources. In this way, the task can be routed to those individuals that provide a higher expected value.

Methods are described for ideally joining human and machine computing resources to solve tasks, based on the construction of predictive models from case libraries of data about the abilities of people and machines and their collaboration. Predictive models include methods for folding together human contributions, such as voting with machine computation, such as automated visual analyses, as well as the routing of tasks to people based on prior performance and interests. An optimal distribution of tasks to selected participants of the plurality of participants is determined according to a model that considers the demonstrated competencies of people based on a value of information analysis that considers the value of human computation and the ideal people for providing a contribution.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
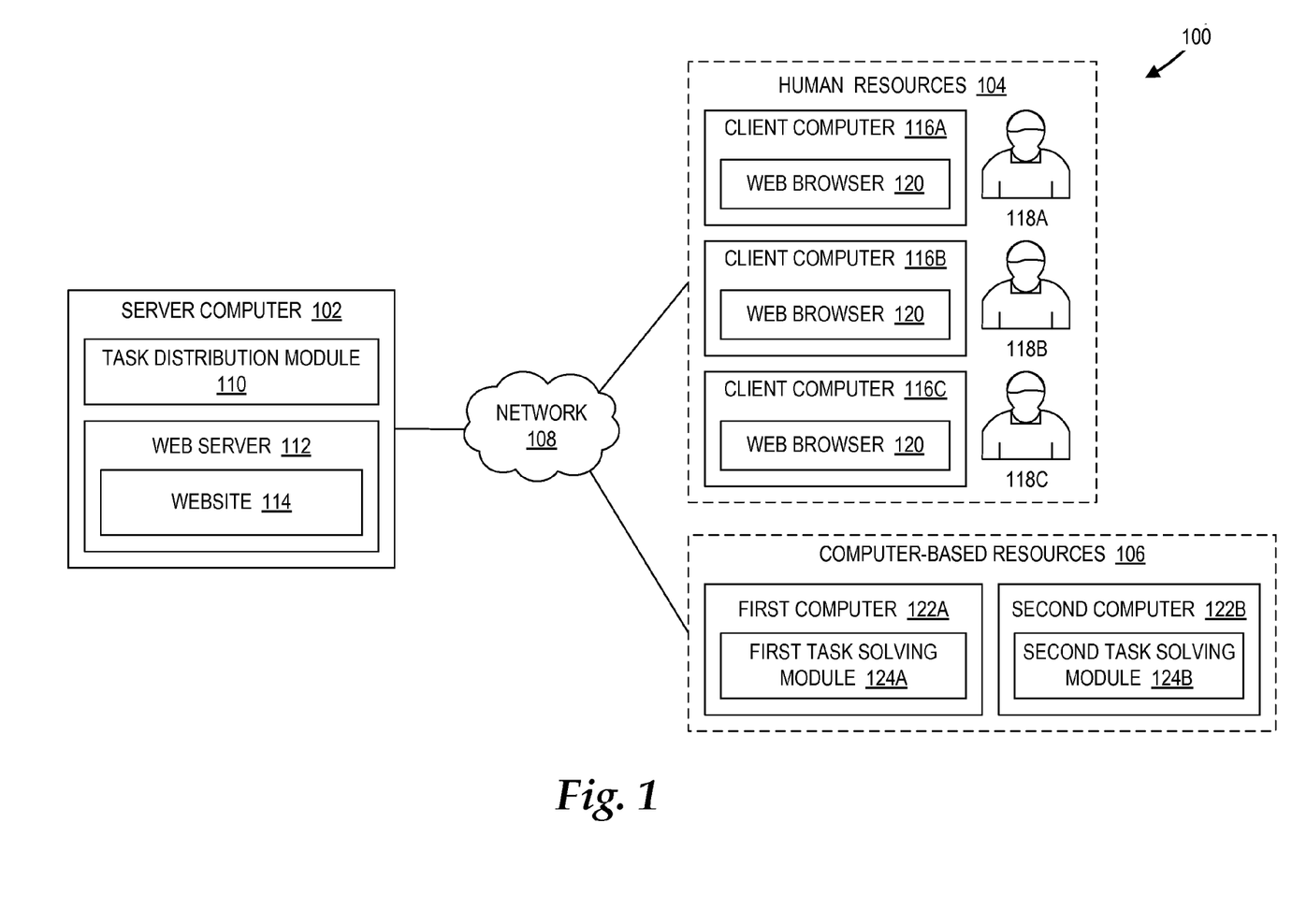
FIG. 1 is an example crowd sourcing problem solving arrangement, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for combining human and machine intelligence to solve tasks with crowd sourcing will be described. In particular, FIG. 1 illustrates an example crowd sourcing problem solving arrangement 100. The crowd sourcing problem solving arrangement 100 includes a server computer 102, human resources 104, and computer resources 106. The server computer 102, the human resources 104, and the computer resources 106 are communicatively coupled via a network 108. The server computer 102 includes a task distribution module 110 and a web server 112. The web server 112 includes a website 114.

The human resources 104 include a first client computer 116A, a second client computer 116B, and a third client computer 116C (collectively referred to as client computers 116). The first client computer 116A, the second client computer 116B, and the third client computer 116C are associated with a first participant 118A, a second participant 118B, and a third participant 118C (collectively referred to as participants 118) respectively. The client computers 116 each include a web browser 120. The computer-based resources 106 include a first computer 122A and a second computer 122B (collectively referred to as computers 122). The first computer 122A and the second computer 122B are configured to provide a first task solving module 124A and a second task solving module 124B (collectively referred to as task solving modules 124) respectively. In other embodiments, the human resources 104 may include any suitable number of client computers associated with any number of participants, and the computer-based resources 106 may include any suitable number of computers and any suitable number of task solving modules. For example, different task solving modules may solve different tasks or different aspects of a given task.

The task distribution module 110 may be configured to route tasks to the human resources 104 and/or the computer-based resources 106 according to an optimal distribution. In one embodiment, the task distribution module 110 may route the tasks to the human resources 104 and/or the computer-based resources 106 such that the human resources 104 and/or the computer-based resources 106 perform the tasks in parallel. For example, a task may involve creating a short description (i.e., a caption) to an image. The task distribution module 110 may distribute the image to the human resources 104 and the computer-based resources 106. Upon receiving the image, the participants 118 and the task solving module 124 can independently create the caption to the image.

In another embodiment, the task distribution module 110 may route the tasks to the human resources 104 and/or the computer-based resources 106 such that the human resources 104 and/or the computer-based resources 106 perform the tasks in a given sequence. In this case, the output from one of the resources 104, 106 can be used to determine the routing of tasks to the other of the resources 104, 106. For example, the output of the computer-based resources 106 may be utilized to guide the routing of tasks to the human resources 104.

In an illustrative example, a task may involve tagging a photograph of a galaxy with one of six galaxy identifiers. The task distribution module 110 may initially send the photograph to the computer-based resources 106. The task solving module 124 then identifies features of the photograph, determines a computer-based probability distribution for each of the six galaxy identifiers based on the features, and sends the features and the computer-based probability distribution to the task distribution module 110. A probability distribution may indicate the likelihood that each galaxy identifier is correct in relation to the other galaxy identifiers. The task solving module 124 may determine the probability distribution by utilizing a machine-based probabilistic model generated according to suitable machine learning methods.

Upon receiving the features and the computer-based probability distribution, the task distribution module 110 may determine an optimal distribution of tasks to the human resources 104 based on the features and other suitable information. In particular, the optimal distribution of tasks may identify selected participants in the participants 118 to whom the tasks are routed. In order to identify the selected participants in the participants 118, the task distribution module 110 may utilize a first machine-based model generated and trained according to suitable machine learning methods. The task distribution module 110 then sends the photograph to the selected participants according to the optimal distribution.

The selected participants each view the photograph and tag the photograph with one of the six galaxy identifiers. As the task distribution module 110 receives the tagged galaxy identifiers from the selected participants, the task distribution module 110 determines a human-based probability distribution for each of the six galaxy identifiers. The task distribution module 110 then combines the computer-based probability distribution and the human-based probability distribution in order to finally tag one of the six galaxy identifiers to the photograph. For example, if both the computer-based probability distribution and the human-based probability distribution indicate a threshold likelihood (e.g., 75%) that a given galaxy identifier is correct, then the task distribution module 110 may tag the photograph with that galaxy identifier. In order to combine the computer-based probability distribution and the human-based probability distribution, the task distribution module 110 may utilize a second machine-based model generated and trained according to suitable machine learning methods.

In conventional crowd sourcing implementations, a task, such as tagging a photograph of a galaxy with one of six galaxy identifiers, is typically advertised and distributed through the website 114. Any available participants in the participants 118 can access the website 114 through the web browser 120 and tag the galaxies. As such, no account is made as to the activity and/or the experience of the participants with respect to the task.

Unlike conventional implementations, some of the embodiments described herein utilize external information, such as the output from the computer-based resources 106, to guide the routing of tasks to selected participants in the participants 118. In particular, the participants may be selected according to activity, experience, and/or other suitable criteria. These criteria can be utilized to train the first machine-based model described above. By routing the task to only a selected few of the participants 118, the participants 118 can be more efficiently and effectively utilized to solve task because the selected participants may be better suited to solve the task according to the relevant criteria.

Figure 2:
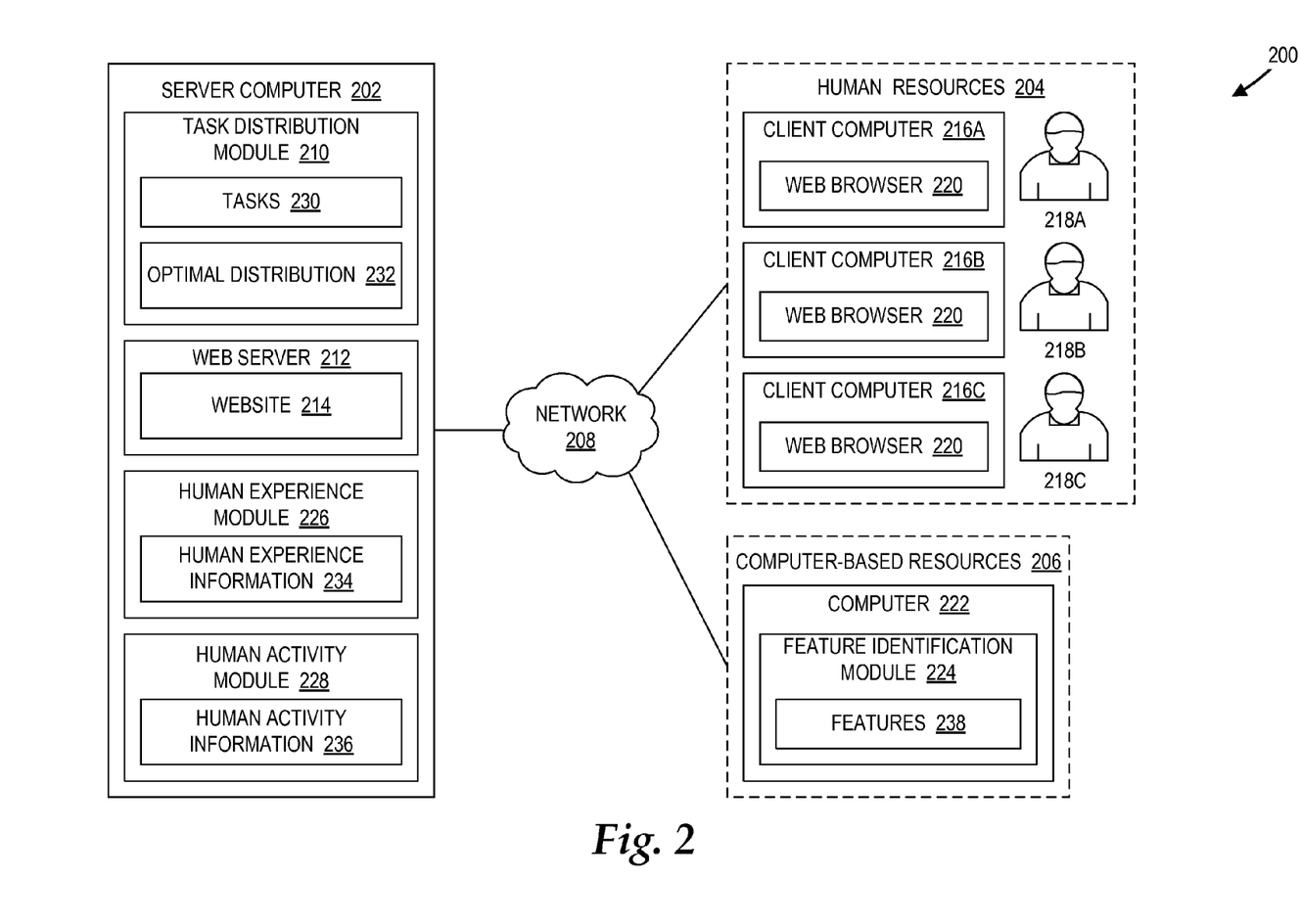
FIG. 2 is another example crowd sourcing problem solving arrangement, in accordance with some embodiments.

Referring now to FIG. 2, additional details regarding the routing of tasks to selected participants will be described. In particular, FIG. 2 illustrates another example crowd sourcing problem solving arrangement 200. The crowd sourcing problem solving arrangement 200 includes a server computer 202, the human resources 204, and the computer-based resources 206. The server computer 202, the human resources 204, and the computer-based resources 206 are communicatively coupled via a network 208. The server computer 202 includes a task distribution module 210, a web server 212, a human experience module 226, and a human activity module 228. The web server 212 includes a website 214.

The human resources 204 include a first client computer 216A, a second client computer 216B, and a third client computer 216C (collectively referred to as client computers 216). The first client computer 216A, the second client computer 216B, and the third client computer 216C are associated with a first participant 218A, a second participant 218B, and a third participant 218C (collectively referred to as participants 218) respectively. The client computers 216 each include a web browser 220. The computer-based resources 106 include a computer 222, which is configured to provide a feature identification module 224. In other embodiments, the feature identification module 224 may be part of the server computer 202. In yet other embodiments, the human resources 204 may include any suitable number of client computers associated with any number of participants, and the computer-based resources 206 may include any suitable number of computers and any suitable number of task solving modules.

According to some embodiments, the task distribution module 210 is configured to (a) partition a large scale problem into a set of tasks 230, (b) for each task in the tasks 230, receive computer-based guidance, such as features 238, to solving the task from the computer-based resources 206, (c) determine a first probability distribution based on the computer-based guidance, (d) receive human experience information 234 regarding the participants 118 from the human experience module 226, (e) receive human activity information 236 regarding the participants 118 from the human activity module 228, (f) determine an optimal distribution 232 of the task to the human resources 204 based the computer-based guidance, the human experience information 234, and the human activity information 236, (g) distribute the task to the human resources 204 according to the optimal distribution 232, (h) receive human-submitted solutions to the task from the human resources 204, (i) determine a second probability distribution based on the human-submitted solutions, and (j) form a global solution for the task based on the first probability distribution and/or the second probability distribution. A non-limiting example of a large scale problem is a classification problem (e.g., tagging an image with an image identifier, tagging descriptions on tens of thousands of photographs, translating multiple compilations of text, etc.).

The task distribution module 210 may utilize the web server 212 to advertise and distribute the tasks 230 via the website 214, for example, over the network 208. The human resources 204 may utilize the web browser 220 to access the website 214. Through the website 214, the human resources 204 can receive the tasks 230 from the task distribution module 210 and provide solutions for the tasks 230 to the task distribution module 210.

Figure 3:
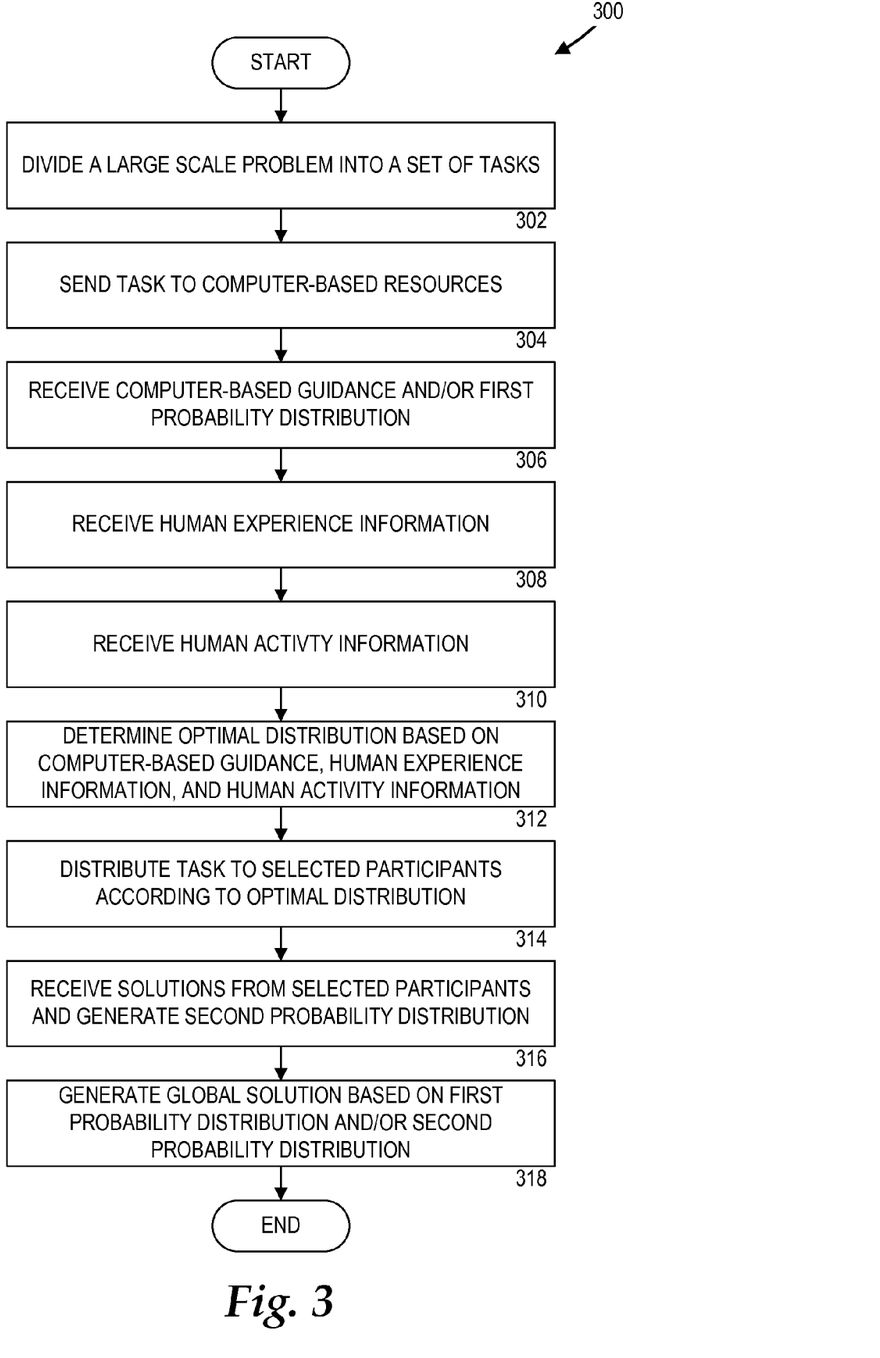
FIG. 3 is a flow diagram illustrating a method for combining human and machine intelligence to route and solve tasks with crowd sourcing, in accordance with some embodiments.

Referring now to FIG. 3, additional details regarding the operations of the task distribution module 210, the feature identification module 224, the human experience module 226, and the human activity module 228 will be described. In particular, FIG. 3 is a flow diagram showing a method for distributing tasks. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 3, a routine 300 begins at operation 302, where the task distribution module 110 divides a large scale problem into the set of tasks 230. In a galaxy classification example, a large scale problem may include classifying a million galaxies based on photographs of the million galaxies. In this case, the task distribution module 210 may divide the large scale problem of classifying the million galaxies into a million individual tasks, each of which involves classifying a particular galaxy based on an associated photograph. When the task distribution module divides the large scale problem into the set of tasks 230, the routine 300 proceeds to operation 304.

At operation 304, the task distribution module 210 sends at least one of the tasks 230 to the computer-based resources 206. The computer-based resources 206 may be configured to computationally analyze the task and generate computer-based guidance to solving the task. The computer-based resources 206 may also generate a first probability distribution based on the computer-based guidance. The probability distribution may include probabilities, each of which is associated with a potential solution to the task. For example, the probabilities may indicate the likelihood that the associated potential solution is correct. The computer-based resources 206 may generate the first probability distributing by utilizing the machine-based probability model as previous described.

In the galaxy classification example, the task distribution module 210 may send a photograph of a particular galaxy to the feature identification module 224. The feature identification module 224 may then identify the features 238 of the galaxy based on suitable computer vision techniques. These features 238 may include aspects of the photograph that may aid an automated classification of the galaxy. The feature identification module 224 may generate a first probability distribution for six potential galaxy identifiers, for example. The probability associated with each of the six potential galaxy identifiers may indicate the likelihood that the photograph of the galaxy should be tagged with the potential galaxy identifier. The feature identification module 224 may also determine a challenge level indicating the difficulty or uncertainty of classifying the galaxy based on the identified features. When the task distribution module 210 sends the task to the computer-based resources 206, the routine 300 proceeds to operation 306.

At operation 306, the task distribution module 210 receives the computer-based guidance and/or the first probability distribution from the computer-based resources 206. The routine 300 then proceeds to operation 308, where the task distribution module 210 receives the human experience information 234 associated with the participants 218 from the human experience module 226. The human experience module 226 may be configured to maintain historical information for each of the participants 218 with respect to solving previous tasks. The human experience information 234 may include the number/percentage of tasks solved correctly, the types of tasks solved correctly, the number/percentage of tasks solved incorrectly, the types of tasks solved incorrectly, the number/percentage of tasks solved, and/or other suitable information indicating the experience level of the human resources 204. Whether a task is solved correctly or incorrectly may be determined through analysis of human experts in the field, agreement with the feature identification module 224, and/or agreement with the majority of other participants in the participants 218. When the task distribution module 210 receives the human experience information 234 associated with the participants 218 from the human experience module 226, the routine 300 proceeds to operation 310.

At operation 310, the task distribution module 210 receives the human activity information 236 associated with the participants 218 from the human activity module 228. The activity information may include a number of tasks solved, an amount of time that the participants 218 are online, a dwell time between solving tasks, and other information indicating the level of activity of the participants 218 and their activity patterns related to solving tasks. For example, the human activity information 236 may indicate the availability and/or productivity of the human resources 204. When the task distribution module 210 receives the human activity information 236 from the human activity module 228, the routine 300 proceeds to operation 312.

At operation 312, the task distribution module 210 determines the optimal distribution 232 of the task based on first probability distribution, the identified features 238, the human experience information 234, and/or the human activity information 236. The task distribution module 210 may determine the optimal distribution 232 by utilizing the first machine-based model as previously described. In particular, the second machine-based model may be trained based on the first probability distribution, the identified features 238, the human experience information 234, and/or the human activity information 236. By analyzing the human experience information 234 and/or the human activity information 236 in relation to the identified features 238 and/or the first probability distribution, the human experience module 226 can determine the particular participants in the participants 218 who are best suited for solving the task. In this way, the human resources 204 can be more effectively and efficiently utilized in crowd sourcing applications. The task distribution module 210 may determine the optimal distribution 232 based on decision theory models, probabilistic models, and/or machine learning models.

In the galaxy classification example, the identified features 238 may indicate a particular type of spiral galaxy, and the first probability distribution may assign a high probability to this type of spiral galaxy. In this case, the task distribution module 210 may determine the optimal distribution 232 by selecting participants in the participants 218 who have a history of correctly identifying this type of spiral galaxy based on the human experience information 234. The task distribution module 210 can further determine the optimal distribution 232 by selecting participants in the participants 218 who are available and/or productive based on the human activity information 236. When the task distribution module 210 determines the optimal distribution 232, the routine 300 proceeds to operation 314.

At operation 314, the task distribution module 210 distributes the task to the selected participants in the participants 118 according to the optimal distribution 232. For example, the task distribution module 210 may provide access to the task through the website 214 provided through the web server 212. The selected participants may then access the task on the website 214 through the web browser 220. In particular, the website 214 may provide functionality enabling the selected participants to view the task, perform the task, and submit a solution to the task. When the task distribution module 210 distributes the task to the selected participants in the participants 118 according to the optimal distribution 232, the routine 300 proceeds to operation 316.

At operation 316, the task distribution module 210 receives the solutions to the task from the selected participants in the participants 218 and generates a second probability distribution based on the human-submitted solutions to the task. For example, probabilities may be assigned according to the number of participants who provided a given solution. That is, a potential solution may be associated with a higher probability if more participants submitted the solution, while the potential solution may be associated with a lower probability if fewer participants submitted the solution. When the task distribution module 210 generates the second probability distribution based on the human-submitted solutions to the task, the routine 300 proceeds to operation 318.

At operation 318, the task distribution module 210 generates a global solution based on the first probability distribution and/or the second probability distribution. For example, the task distribution module 210 may select a potential solution that surpasses a given threshold (e.g., 75% probability) in the first probability distribution and/or the second probability distribution. The task distribution module 210 may also determine that the task cannot be solved when one or more potential solutions fall below a given threshold in the first probability distribution and/or the second probability distribution. The task distribution module 210 may determine the global solution by utilizing the second machine-based model as previously described.

In other embodiments, the task distribution module 210 may discard the task during the routine 300 at operation 306, for example, instead of distributing the task to the human resources 204. For example, upon receiving the first probability distribution, the task distribution module 210 may determine that none of the probabilities in first probability distribution exceed a given threshold. In this case, the fact that the computer-based resources 206 cannot solve the task within the given probability may indicate that the human resources 204 may have similar difficulty. By discarding the task at this point of the routine 300, the task distribution module 210 can better utilize the human resources 204 for solving other tasks.

In other embodiments, the task distribution module 210 may determine the optimal distribution 232 based further on a cost-benefit analysis. In one example, in addition to human experience information 234 and the human activity information 236, the task distribution module 210 may select a certain number and/or certain types of participants based on the cost of the participants and budget constraints. In another example, the computer-based resources 206 may include multiple task solving modules operating on multiple computers, each of which is associated with a different cost to operate. In this case, the task distribution module 210 may send the task to only selected task solving modules in the computer-based resources 206 according to the budget constraints.

Figure 4:
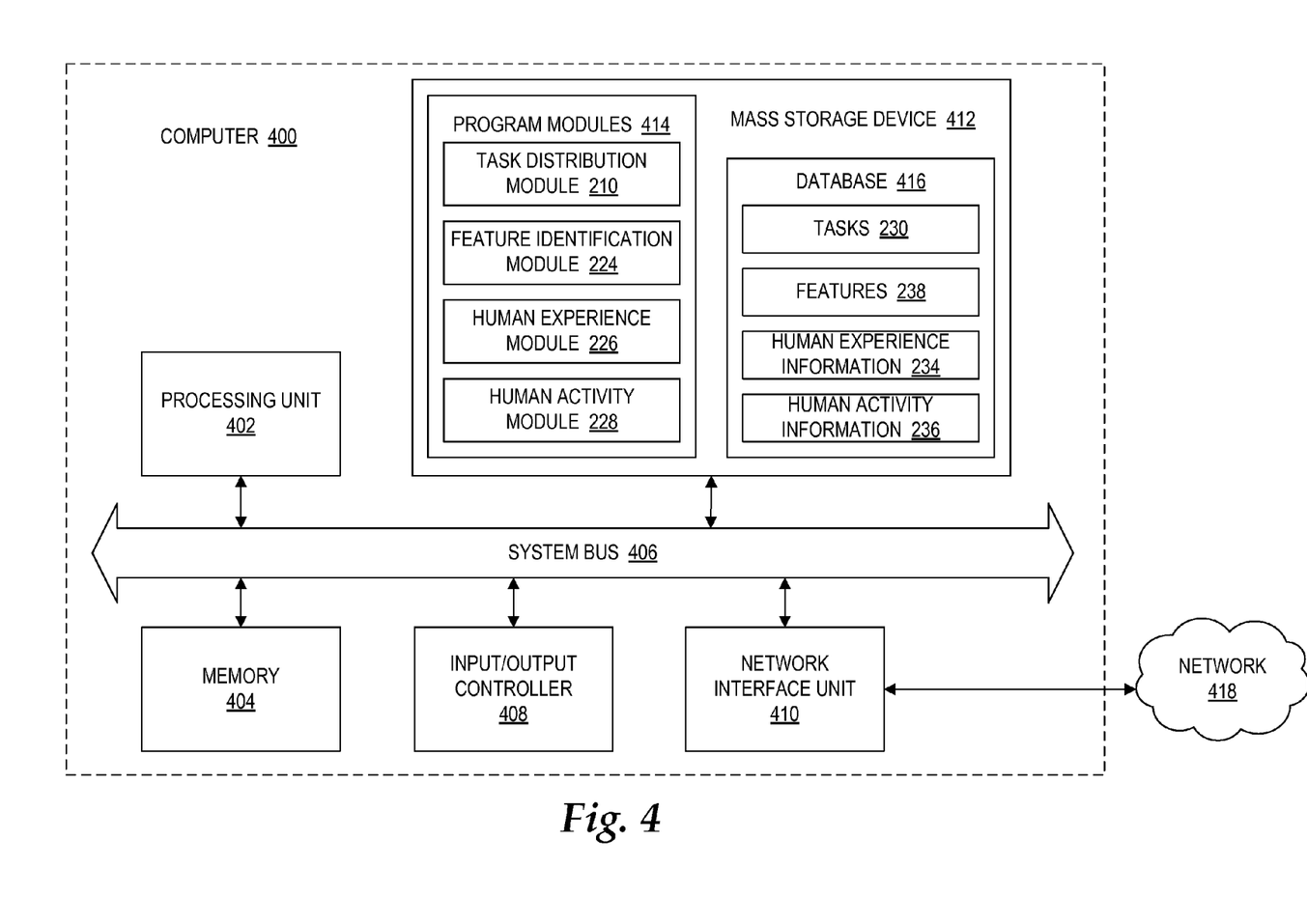
FIG. 4 is a computer architecture diagram showing an illustrative computer hardware architecture for a computing system capable of implementing the embodiments presented herein.

Turning now to FIG. 4, an example computer architecture diagram showing a computer 400 is illustrated. Examples of the computer 400 may include the server computers 102, 202, the client computers 116, 216, and the computers 122, 222. The computer 400 may include a processing unit 402 ("CPU"), a system memory 404, and a system bus 406 that couples the memory 404 to the CPU 402. The computer 400 may further include a mass storage device 412 for storing one or more program modules 414 and a database 416. Examples of the program modules 414 may include the task distribution module 210, the feature identification module 224, the human experience module 226, and the human activity module 228. The database 416 may be configured to store the tasks 230, features 238 and other computer-based guidance, the human experience information 234, and/or the human activity information 236. The mass storage device 412 may be connected to the CPU 402 through a mass storage controller (not shown) connected to the bus 406. The mass storage device 412 and its associated computer-storage media may provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to combine human and machine intelligence to route and solve tasks. The program modules 414 may also provide various tools or techniques by which the computer 400 may participate within the overall systems or operating environments using the components, flows, and data structures discussed throughout this description. For example, the program modules 414 may implement interfaces for combining human and machine intelligence to route and solve tasks.

In general, the program modules 414 may, when loaded into the processing unit 402 and executed, transform the processing unit 402 and the overall computer 400 from a general-purpose computing system into a special-purpose computing system customized to combine human and machine intelligence to route and solve tasks. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for combining human and machine intelligence to route and solve tasks are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
receiving computer-based guidance for solving a task from a computer-based resource;
receiving historical human resource experience information associated with a plurality of participants, the historical human resource experience information indicating an experience level for individuals of the plurality of participants with respect to solving previous tasks;
receiving historical human resource activity information associated with the plurality of participants, the historical human resource activity information indicating an availablility and an activity level for the individuals of the plurality of participants with respect to solving the previous tasks or other previous tasks;

generating a distribution of the task to selected participants in the plurality of participants based on the computer-based guidance, the historical human resource experience information, and the historical human resource activity information; and generating a global solution to the task based on the computer-based guidance and human-based contributions from the selected participants.

2. The computer-implemented method of claim 1, further compromising:

routing the task to the selected participants in the plurality of participants according to the distribution; and receiving the human-based contributions from the selected participants in the plurality of participants.

3. The computer-implemented method of claim 1, wherein the historical human resource experience information is associated with backgrounds of the individuals.

4. The computer-implemented method of claim 3, wherein the historical human resource activity information comprises an activity pattern indicating human resource productivity for the individuals of the plurality of participants with respect to solving the previous tasks or the other previous tasks.

5. The computer-implemented method of claim 1, further comprising generating a model for combining the computer-based guidance and human-based contributions for solving the task from the selected participants in the plurality of participants, wherein the global solution is generated according to the model.

6. The computer-implemented method of claim 1, wherein the task comprises classifying an image with a selected image identifier from a plurality of image identifiers.

7. The computer-implemented method of claim 6, wherein the receiving the computer-based guidance comprises receiving predictive output from a probabilistic model based on features of the image identified through computer vision techniques.

8. The computer-implemented method of claim 6, wherein the receiving the human-based contributions comprise human votes, wherein individual human votes classify the image with one of the plurality of image identifiers.

9. The computer-implemented method of claim 6, wherein the generating the global solution to the task is based on a probability distribution, wherein the probability distribution is generated based on whether individual image identifiers of the plurality of image identifiers correctly classify the image.

10. The computer-implemented method of claim 1, wherein the generating the distribution of the task further comprises:

determining an expected value of information of the human-based contributions; and generating the distribution of the task based on the expected value of information of the human-based contributions.

11. A computer-readable storage medium having computer-executable instructions stored thereon which, when executed by a computer, cause the computer to:

generate a model for routing a task;

generate a distribution of the task to selected participants in a plurality of participants according to the model, wherein the distribution is based on historical human resource experience and activity information indicating an experience level and an activity level for individuals of the plurality of participants with respect to solving previous tasks, the historical human resource exrerience and activity information beinci received prior to beginning processing of the task;

route the task to the selected participants according to the distribution; and receive human-based contributions for solving the task from the selected participants.

12. The computer-readable storage medium of claim 11, wherein the previous tasks include different types of tasks than the task, and wherein the computer-executable instructions further cause the computer to train the model with prior performance of the individuals of the plurality of participants with respect to solving the previous tasks including the different types of tasks.

13. The computer-readable storage medium of claim 11, wherein the computer-executable instructions further cause the computer to train the model with interests of the individuals of the plurality of participants.

14. The computer-readable storage medium of claim 11, wherein the computer-executable instructions further cause the computer to:

receive computer-based guidance for solving the task, the task being from a computer-based resource;

generate a second model for combining the computer-based guidance and the human-based contributions; and generate a global solution to the task by combining the computer-based guidance and the human-based contributions according to the second model.

15. The computer-readable storage medium of claim 11, wherein the model uses output from a probabilistic model to generate the distribution of the task.

16. The computer-readable storage medium of claim 11, wherein the model comprises a decision-theoretic model that is used to route the task based on a value of information analysis.

17. The computer-readable storage medium of claim 11, wherein the computer-executable instructions further cause the computer to:

determine an expected value of information for the individuals of the plurality of participants; and generate the distribution of the task based on the expected value of information.

18. A computer system, comprising:

a processor;

a memory communicatively coupled to the processor; and a task distribution module which executes in the processor from the memory and which, when executed by the processor, causes the computer system to route and solve tasks in a crowd sourcing application by:

generating a model based on machine learning techniques, generating a distribution of an individual task to selected participants in a plurality of participants according to the model, the distribution based on historical human resource experience and activity information that was collected during completion of a previous crowd sourcing application and prior to generation the model, routing the individual task to the selected participants according to the distribution, receiving human-based contributions for solving the individual task from the selected participants, receiving computer-based guidance for solving the individual task from a computer-based resource, and generating a global solution to the individual task by combining the computer-based guidance and the human-based contributions according to the model.

19. The computer system of claim 18, wherein the individual task comprises classifying an image with a selected image identifier from a plurality of image identifiers.

20. The computer system of claim 19, wherein:
receiving the computer-based guidance comprises receiving predictive output from a probabilistic model based on features of the image identified through computer vision techniques;
receiving the human-based contributions comprises receiving human votes, individual human votes classifying the image with one of the plurality of image identifiers; and
generating the global solution to the individual task is based on a probability distribution, wherein the probability distribution is generated based on whether individual image identifiers of the plurality of image identifiers correctly classify the image.

\* \* \* \* \*